(12) United States Patent
Knowlton

(10) Patent No.: US 7,044,411 B2
(45) Date of Patent: May 16, 2006

(54) METHOD OF WINDING SHEETING WITH FILLER STRIPS

(75) Inventor: Michael Knowlton, Newville, PA (US)

(73) Assignee: Carlisle Management Company, Syracuse, NY (US)

( * ) Notice: Subject to any disclaimer, the term of this patent is extended or adjusted under 35 U.S.C. 154(b) by 129 days.

(21) Appl. No.: 10/765,661

(22) Filed: Jan. 27, 2004

(65) Prior Publication Data

US 2004/0185218 A1    Sep. 23, 2004

Related U.S. Application Data

(60) Provisional application No. 60/445,973, filed on Feb. 6, 2003.

(51) Int. Cl.
    B65H 18/28      (2006.01)
(52) U.S. Cl. .............. 242/160.1; 242/530; 428/77; 428/906
(58) Field of Classification Search ............. 428/77, 428/192, 194, 906; 206/412; 242/530, 160.1, 242/174, 159
    See application file for complete search history.

(56) References Cited

U.S. PATENT DOCUMENTS

| | | | |
|---|---|---|---|
| 2,589,202 A | 3/1952 | Newman | 282/19 |
| 2,782,914 A | 2/1957 | Giles | 206/59 |
| 3,386,527 A | 6/1968 | Daubert et al. | 181/33 |
| 4,007,835 A | 2/1977 | Klothe | 206/411 |
| 4,421,807 A | 12/1983 | Clausing et al. | 428/41 |
| 4,715,915 A | 12/1987 | Vanderzee | 156/182 |
| 4,735,838 A | 4/1988 | Roberts et al. | 428/40 |
| 4,751,122 A | 6/1988 | May | 428/41 |
| 4,767,653 A | 8/1988 | Renstrom | 428/40 |
| 4,948,638 A | 8/1990 | Francis | 428/35.2 |
| 4,950,511 A | 8/1990 | Francis | 428/35.2 |
| 5,182,156 A | 1/1993 | Pape et al. | 428/130 |
| 5,469,671 A | 11/1995 | Rathgeber et al. | 52/58 |
| 5,658,632 A * | 8/1997 | Krabill | 428/43 |
| 5,747,131 A | 5/1998 | Kreckel | 428/40 |
| 5,806,271 A | 9/1998 | Van Someren et al. | 52/750 |
| 5,935,669 A | 8/1999 | Leeuwenburgh | 428/40.1 |
| 6,124,018 A | 9/2000 | Yoshino | 428/40.1 |
| 6,217,692 B1 | 4/2001 | Kling | 156/229 |
| 6,378,259 B1 | 4/2002 | Carlson | 52/408 |

* cited by examiner

Primary Examiner—Alexander S. Thomas
(74) Attorney, Agent, or Firm—Wood, Herron & Evans, L.L.P.

(57) ABSTRACT

A method of rolling a membrane sheeting having a preapplied seam tape is disclosed. In order to provide a uniform diameter of the formed roll, filler strips are placed along the field portion of the membrane sheeting parallel to the seam tape. This is then rolled up to form a uniformly thick roll of membrane sheeting.

4 Claims, 1 Drawing Sheet

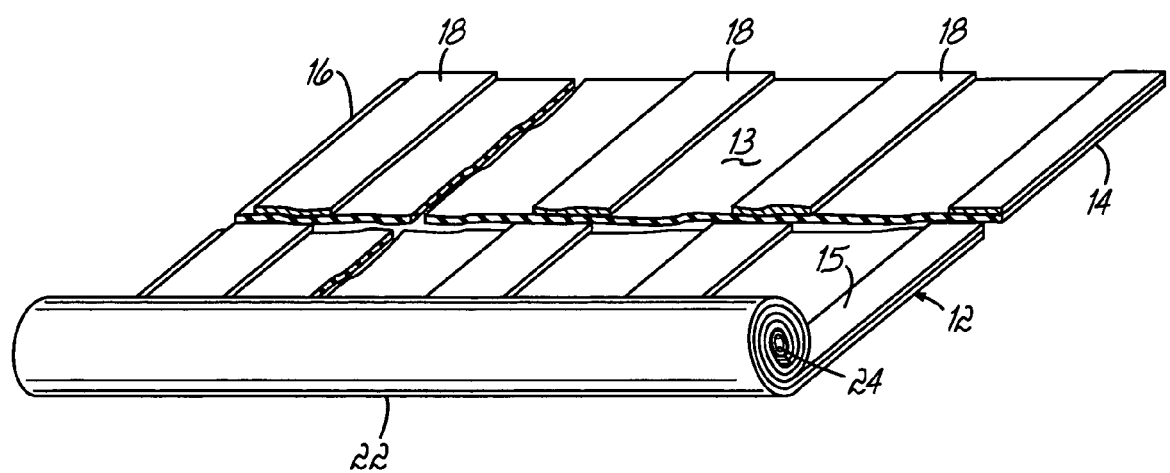

METHOD OF WINDING SHEETING WITH FILLER STRIPS

This application claims the benefit of Provisional Application No. 60/445,973, filed Feb. 6, 2003.

BACKGROUND

Single-ply membrane roofing incorporates a single-ply polymeric membrane such as EPDM as a water barrier for a roof surface. This can also be used as pond liners as well as other applications. As it is impractical to manufacture polymeric sheeting which can completely cover most roofs, individual sheets are adhered together along lap seams to form a continuous water impervious sheet.

In the past the lap seams have been completely formed at the construction site. This requires that, when necessary, the overlapping edges be cleaned, a primer applied and then an adhesive. Adhesive seam tape is frequently used to form a lap seam. There are a variety of different roofing seam tapes that can be applied. These are generally very tacky. Upon contact they adhere to the overlapped edges of sheeting forming a lap seam.

In order to reduce on-site labor, it is desirable to have the seam tape preapplied to the roofing membrane. Unfortunately, when one preapplies seam tape to the edge of a membrane, it interferes with storing and shipping the sheeting. Typically the sheeting is rolled onto a cylindrical core. Because typical sheeting has uniform thickness, one can roll an indefinite length of material on the core. However, when a seam tape is applied to the edge of the sheeting, the sheeting cannot be simply rolled. The seam edge is twice as thick as the remaining portion of the sheet. Rolling this would form a conical-shaped roll. This interferes with shipping.

SUMMARY OF THE INVENTION

The present invention is premised on the realization that sheeting having preapplied seam tape along one edge can be rolled to form a cylinder having a generally uniform cross-section. More particularly the present invention is premised on the realization that such a roll can be formed by inserting flexible filler strips along the field of the membrane sheeting prior to rolling the sheeting. Thus as the sheeting is rolled, the filler strips will maintain a uniform diameter for the roll across the entire roll.

The objects and advantages of the present invention will be further appreciated in light of the following detailed description and drawing in which:

BRIEF DESCRIPTION OF THE DRAWING

The FIGURE is a diagrammatic depiction of the present invention.

DETAILED DESCRIPTION

As shown in the FIGURE, the present invention is roof sheeting 12 which incorporates a field portion 13, a seam edge portion 14 and a second edge portion 16. Edge portion 14 includes a layer of seam tape 15 applied along the edge. The sheeting can be any sheeting typically used for roofing and pond liners, and the like, such as EPDM, thermoplastic elastomer, or PVC. EPDM is preferred. Generally this will have a thickness of 30 to 100 mil, typically 45 to 60 mil. The seam tape will have a thickness of approximately 35 to 40 mil.

The seam tape may be any type of seam tape used in the roofing industry. It may be thermoplastic or thermosetting. Preferably, it is a pressure sensitive tape. There are several commercially available seam tapes available for use in the roofing industry. Although the width of the seam tape can vary depending on type and application requirements, it will generally be at least about 3 inches wide.

The method of applying the seam tape 15 to the membrane sheeting 12 of the present invention does not form part of the present invention. The seam tape is generally applied in the factory by first applying a primer layer along a clean edge 14 of the membrane. Subsequently, the seam tape 15 is pressed against the membrane along the edge 14. The exposed surface of the seam tape is generally covered with a protective release sheeting (not shown).

Alternatively, a double wide tape (i.e., 6–7 inches wide) can be applied along the center line of the sheeting. The sheeting can then be cut along the center of the seam tape to form two sheets of equal width. Again, the method of forming the sheeting with the applied seam tape forms no part of the present invention.

To form a roll of the sheeting, at least one filler strip 18 generally 6" wide is placed on the field portion 13 or opposite edge of sheet 12 which is rolled out on the floor. Preferably, a plurality of filler strips are placed on the sheet parallel to seam tape 15. For a ten foot wide sheet, five evenly spaced strips are adequate. The filler strips 18 are preferably cardboard strips having a thickness about equal to the thickness of the seam tape including the release sheeting.

The sheeting 12 with the filler strips 18 and seam tape 15 is then rolled up to form a roll 22 of membrane sheeting having a uniform diameter across the width of the roll. The roll can be formed manually or can be formed using any standard rolling equipment. Preferably, the roll 22 will be wound around a central cardboard roll 24, as shown. This rolling method permits the application of the seam tape at the factory, reducing on site labor. This provides a value added product. Further, the roll has a uniform cross section which facilitates shipping.

When this is used at a roof site, the roll is simply unrolled and the filler strips 18 are discarded. The seam tape 15 can then be used to form a lap seam with an adjoining membrane sheet.

Although the present invention has been described for roofing application, it can be used to form any waterproof barrier including, for example, pond liners.

This has been a description of the present invention along with the preferred method of practicing the present invention. The invention itself should only be defined by the appended claims whereby

We claim:

1. A method of rolling membrane sheeting having a preapplied seam tape along one edge comprising placing a plurality of filler strips on said sheeting parallel to said seam tape and rolling said sheeting whereby said seam tape forms a first edge of a formed roll and the filler strips are rolled simultaneously with said sheeting.

2. The method claimed in claim 1 whereby said filler strips have a thickness equal to the thickness of said seam tape.

3. The method claimed in claim 1 wherein one of said filler strips is positioned along a second edge of said sheeting.

4. A roll of membrane sheeting having a first edge and a field portion, a seam tape along said first edge, a plurality of filler strips in said field portion and along a second edge of said membrane sheeting, said filler strips positioned parallel to said first edge.

* * * * *